UNITED STATES PATENT OFFICE.

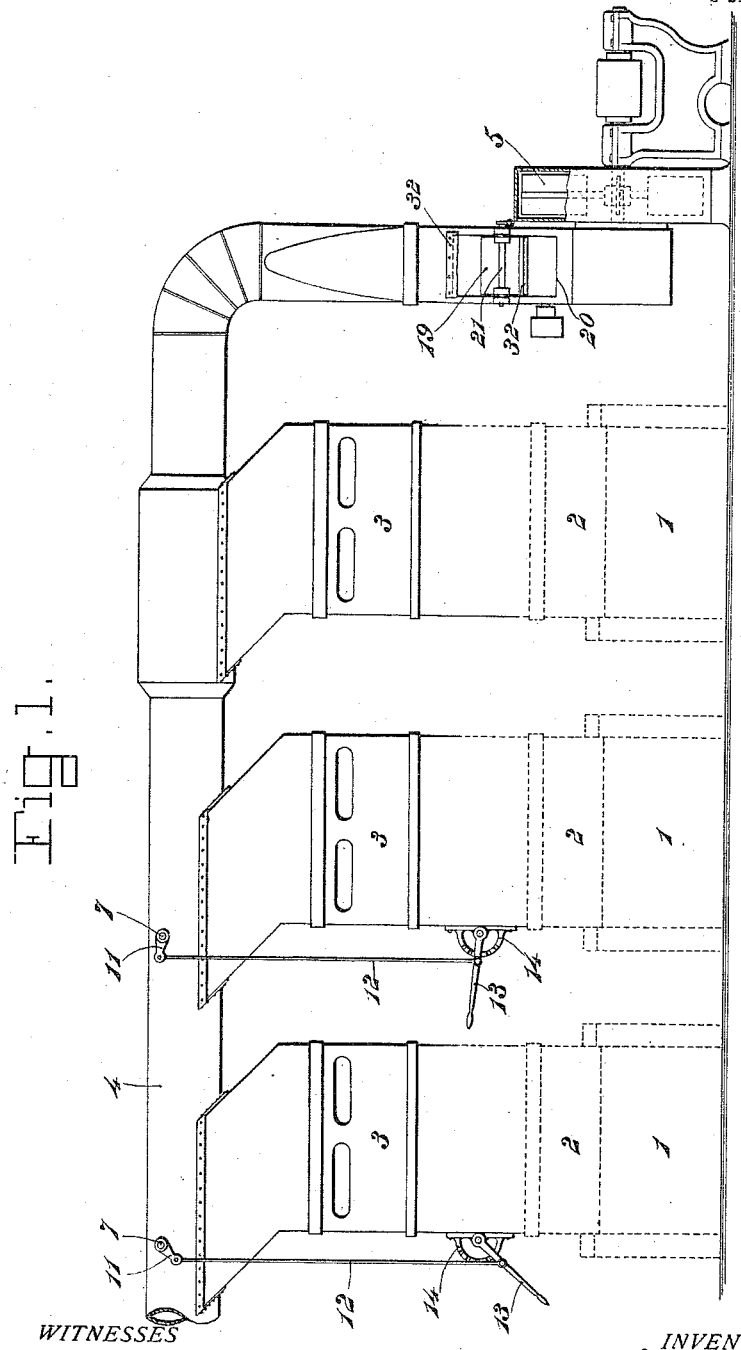

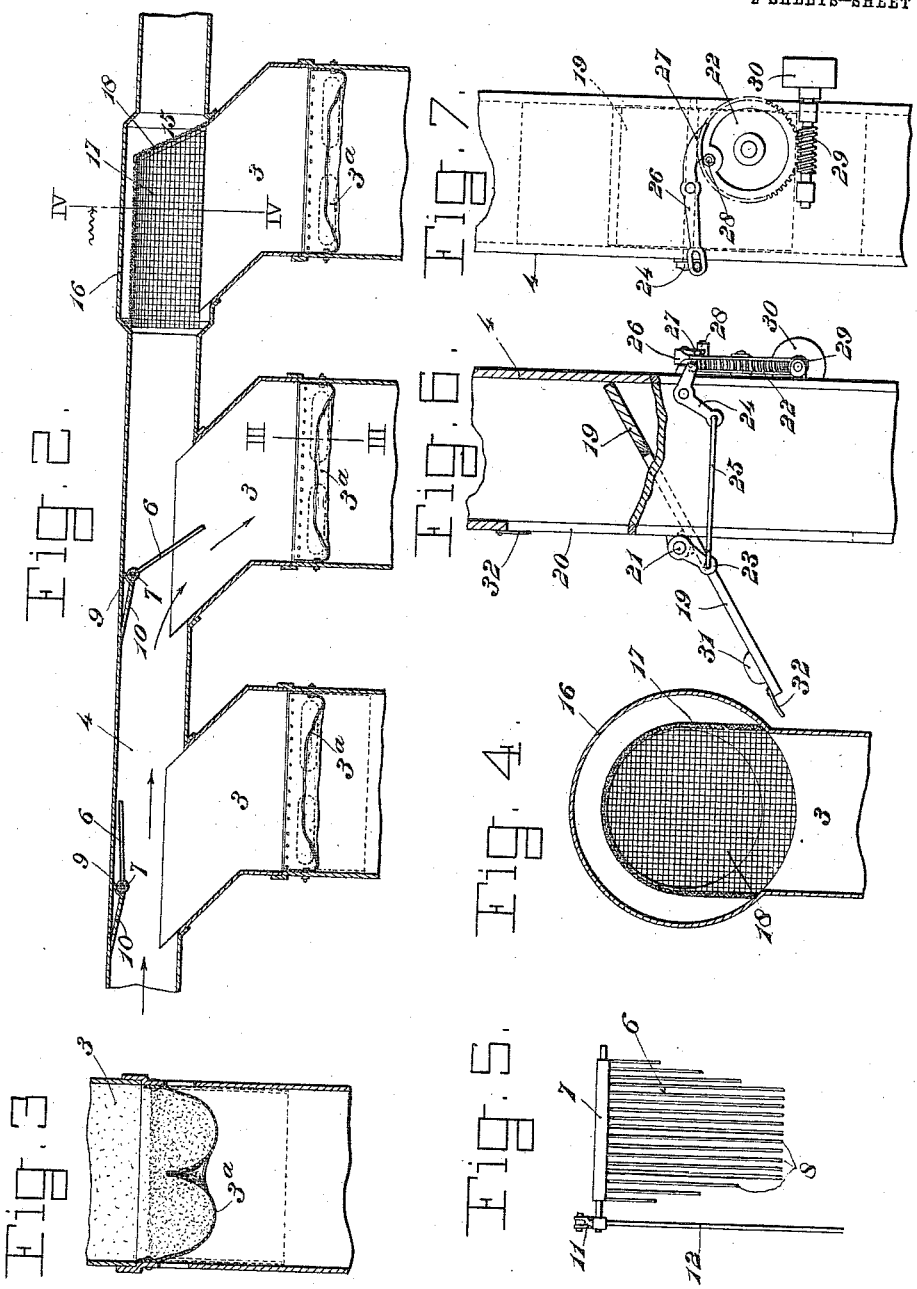

FRANK PHELPS, OF LITTLE ROCK, ARKANSAS.

COTTON-DISTRIBUTER.

985,930.  Specification of Letters Patent.  Patented Mar. 7, 1911.

Application filed May 12, 1909. Serial No. 495,524.

*To all whom it may concern:*

Be it known that I, FRANK PHELPS, a citizen of the United States, residing at Little Rock, in the county of Pulaski and State of Arkansas, have invented certain new and useful Improvements in Cotton - Distributers; and I do hereby declare the following to be a full, clear, and exact description of the invention, such as will enable others skilled in the art to which it appertains to make and use the same.

My invention relates to pneumatic cotton conveyers or distributers and its object is to provide simple and efficient means for periodically breaking the vacuum in the feed chute to discharge the cotton.

The invention will first be described with reference to the accompanying drawings, and then more particularly pointed out in the appended claim.

Referring to the drawings—Figure 1 is a side elevation of an embodiment of the invention showing the distributer adapted to three gins, the latter and the gin feeders therefor being shown in dotted lines. Fig. 2 is a vertical longitudinal section of a portion of the structure illustrated in Fig. 1, the parts being shown as when delivering cotton to the second gin but not to the first or third gins. Fig. 3 is a vertical section, on an enlarged scale, on the line III—III of Fig. 2. Fig. 4 is a vertical section on the line IV—IV of Fig. 2. Fig. 5 is a detail elevation of a movable deflector. Fig. 6 is a side elevation, partly in section, of a portion of the air and cotton tube having a damper or valve therein and the operating mechanism for the valve. Fig. 7 is a rear elevation of the parts shown in Fig. 6.

1 denotes the gins, 2 the gin feeders, and 3 feed-chutes, sometimes termed "vacuum boxes," which communicate with the gin feeders and with a tube 4 that serves as a conduit through which cotton is pneumatically conveyed to the gins.

The tube 4 is designed to be extended into a house or wagon containing cotton, and an air pressure is created in the tube that will carry the seed cotton to the gins. This air pressure may be produced by a suitably actuated suction fan 5 connected to the tube at that end of it remote from the intake and beyond the gin stands, the fan operating to draw air laden with cotton through the tube 4, the cotton being distributed to the gins and the air being expelled through the fan casing.

To control the distribution of cotton to the gins, a movable deflector 6 is provided for each gin, excepting the one nearest the fan 5. These movable deflectors are mounted in the tube 4 near the front sides of the feed-chutes, that is the side nearer the intake of the tube 4; and the feed-chutes, at their connection to the tube, are inclined toward said intake end. The deflectors 6 are formed to be movable into the column of air to deflect the cotton therefrom, but not to obstruct the passage of air. The deflectors shown comprise a shaft 7 pivoted in the top of the tube 4, and provided with outstanding fingers 8 spaced apart, said fingers having their outer ends free or unconnected so that when turned down into the moving column of cotton the latter will not hang on the fingers but will be simply deflected by them from the air current into the chute below in which the cotton will be temporarily retained by the vacuum produced by the fan 5 acting on an open-bottom sack $3^a$ to temporarily form it into a closed-bottom receptacle in a manner well known in the art. These sacks $3^a$ are shown having their upper edges secured to the interior of the feed-chutes above openings in the sides thereof which communicate with the atmosphere, so that when the air is rarefied in the tube, the bottoms of the sacks will be drawn upward from the position shown in dotted lines in Figs. 2 and 3 to that shown in full lines in the same figures to form the said temporary closed-bottom receptacles. The cotton is automatically discharged from the chutes 3 by the periodic breaking of the vacuum as hereinafter explained. The variation in length of the fingers, as shown in Fig. 5, is to accommodate the deflector to the circular cross-section of the tube 4. The fingers may be made of wire if desired. The space between the shaft 7 and the tube above it, is closed with a filler 9 which prevents the air and cotton from passing over the top of the shaft 7. This filler is inclined as at 10 to prevent the formation of an abrupt face against which the cotton would lodge, and also to aid in deflecting the cotton toward the chute beneath.

As a convenient means for rotating the deflectors into and out of the column of air and cotton, that is toward or away from their respective chutes, the shaft 7 is provided with a crank-arm 11 to which is pivoted a rod 12 operable by means of a hand-lever 13 which works over a toothed segment 14 in the usual manner. With all of the feed-chutes, excepting the last one, by turning a deflector so that its fingers will point upward away from the corresponding chute, the cotton will pass over such chute without being deflected therein and will be carried on to some of the chutes beyond. None of the cotton, however, must pass the last feed-chute. To accomplish this a deflector 15, of an open-work structure, such, for example, as that shown, is fixed in an enlargement 16 of the tube 4 over the chute of the last gin stand. This deflector permits the passage of air but prevents the passage of cotton beyond such chute. The deflector 15 is formed with a portion 17 substantially parallel to the tube 4 and terminating in a downwardly inclined portion 18 that crosses the opening of the tube at the rear wall of the feed chute. The enlargement 16 enables the portion 17 of said deflector to be in substantial alinement with the wall of the tube 4, thereby avoiding a contraction of the space within the tube, and at the same time providing a space between such portion of the deflector and the enlargement for the passage of air.

The means illustrated for periodically breaking the vacuum in the feed-chutes to discharge the cotton therefrom, comprises an oscillatory valve or damper 19 and its actuating mechanism controlling an opening 20 in the tube 4, the opening 20 connecting the interior of the tube with the atmosphere at a point intermediate the fan 5 and the last feed-chute. The valve 19 is mounted in the opening 20 by means of a shaft 21 which is fixed to the valve and is mounted to oscillate in suitable bearings secured to the tube at opposite sides of the opening 20. The valve is oscillated by a system of connected levers actuated by a worm-wheel 22 at every revolution thereof. The connected system of levers comprises a crank-arm 23 fast to the shaft 21, a bell-crank lever 24 fulcrumed on the tube 4 and having one arm connected to the crank-arm 23 by a rod 25 and having its other arm in pin-and-slot engagement with one end of a lever 26, the other end of which is formed with a cam 27 that is engaged at each revolution of the worm-wheel 22 by a pin or projection 28 carried by said wheel. The worm-wheel is rotatably mounted on the tube 4; and it is driven by a suitably mounted worm 29 which is provided with a pulley 30 that can be driven from the line shaft (not shown). The valve 19 may be provided with a weight 31 for returning the valve to its closed position; and strips 32, which may be of leather, are preferably used on the tube and valve to aid in closing the opening 20.

The operation, generally stated, of the invention is as follows: The intake end of the tube 4 being in position in a wagon or house containing cotton, and the fan 5 being in operation the cotton is drawn in with the air. With the deflectors 6 in the position shown in Fig. 2, the cotton will pass over the first feed-chute and will be deflected out of the air current into the vacuum of the second feed-chute by the deflector 6 thereof. If this deflector were inclined but slightly toward the feed-chute, a portion only of the cotton would be deflected out of the air current and the remainder of the cotton would pass on to the deflector 15 by which it would be directed into the last feed-chute. It will be therefore seen that by regulating the deflectors 6, the supply of cotton to the gins can be so controlled that the cotton can be simultaneously distributed to all or any number of them; or all of the cotton directed into one gin; or the cotton can be prevented from entering the feed-chute of any of the gins when desired.

The operation of the mechanism in automatically effecting the periodic discharge of cotton from the feed-chutes into the gin feeders is as follows: Assuming the opening 20 in the tube 4 to have been closed by the valve 19, the air in the tube will be rarefied by the fan 5, causing the sacks 3$^a$ to assume their closed position as shown in Figs. 2 and 3. As the worm-wheel 22 revolves its pin 28 strikes the cam-end of the lever 26, rocking the latter and through the connected levers oscillating the valve to the position shown in Fig. 6. In this position the suction of the fan is cut off from the feed-chutes and the interior of the tube 4 is placed in communication with the atmosphere; whereupon pressure being equalized above and below the sacks 3$^a$, the free ends of the latter fall, discharging the cotton. When the pin 28 passes the cam 27, the weight 31 of the valve closes the latter and the foregoing described operations are repeated.

While the invention has been illustrated in connection with three gins, it is evident that the principle can be equally well applied to any number of gins.

Having described my invention, what I claim is:

In a cotton distributer, the combination with a tube forming a conduit for cotton and air, of means for producing a vacuum therein; and means for breaking the vacuum comprising an oscillatory valve controlling an opening in the tube communicating with the atmosphere, a crank-arm rigid with the valve, a bell-crank lever, a rod operably connecting the crank-arm with one arm of the bell-crank lever, a lever 26 operably engaging the other arm of the bell-crank lever, a worm-wheel having a projection adapted to strike the free end of lever 26 to rock the latter; means for rotating the worm wheel, and means for returning the valve to its closed position.

In testimony whereof I affix my signature, in presence of two witnesses.

FRANK PHELPS.

Witnesses:
A. E. MOORE,
H. A. BABBITT.

Copies of this patent may be obtained for five cents each, by addressing the "Commissioner of Patents, Washington, D. C."